June 5, 1934.  L. F. NENNINGER  1,961,524
MILLING MACHINE
Filed May 31, 1930
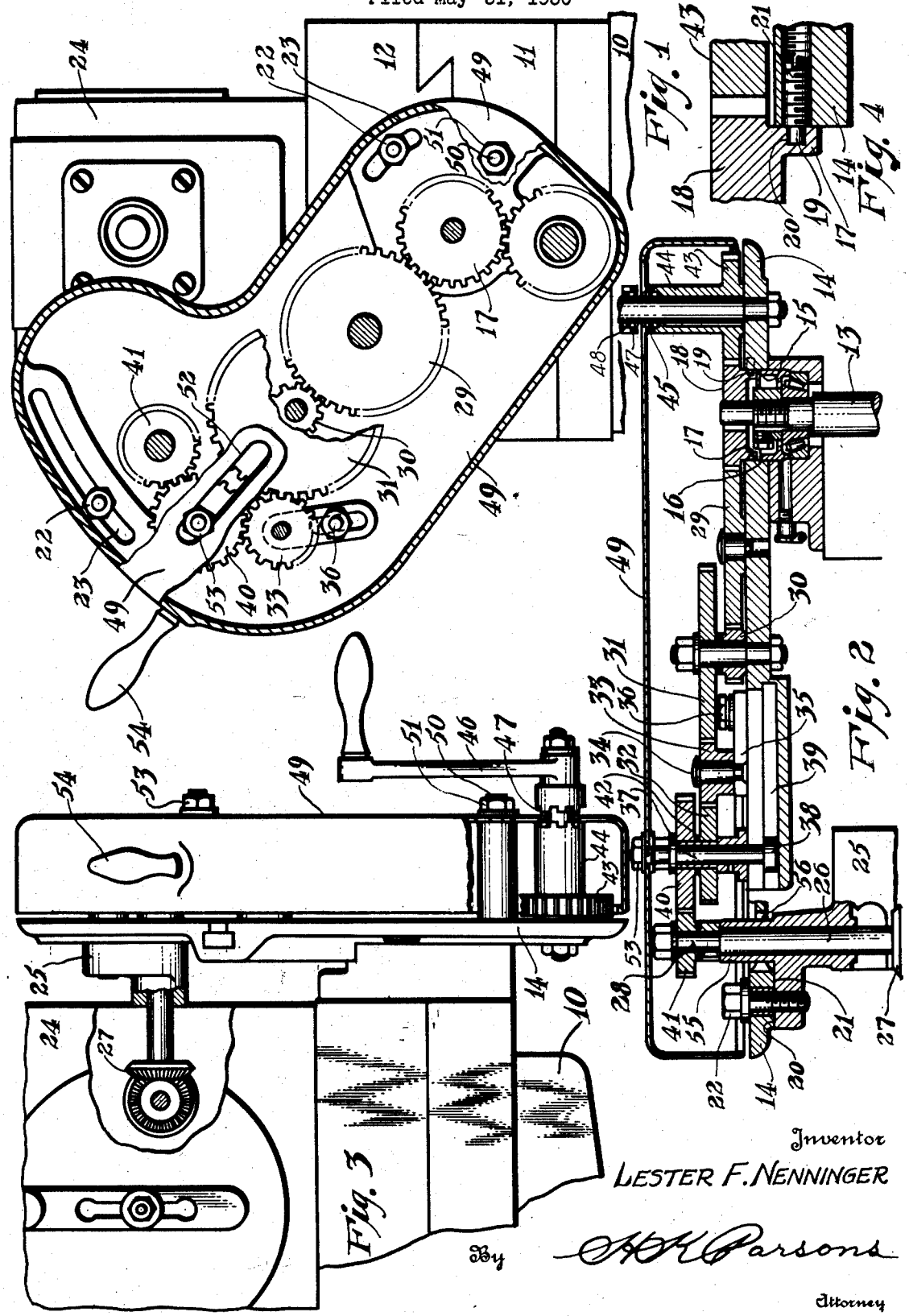
Inventor
LESTER F. NENNINGER
By A. H. Parsons
Attorney Patented June 5, 1934

1,961,524

UNITED STATES PATENT OFFICE 1,961,524

MILLING MACHINE

Lester F. Nenninger, Cincinnati, Ohio, assignor to The Cincinnati Milling Machine Company, Cincinnati, Ohio, a corporation of Ohio Application May 31, 1930, Serial No. 458,622

9 Claims. (Cl. 90—11)

This invention relates to milling machines and more particularly to an improved transmission for actuating attachments thereof.

One of the principal objects of this invention is the provision of an improved transmission unit for actuating an attachment to a milling machine such as a spiral or dividing head and which is adapted to receive power from an existing power driven member in the machine.

Another object of this invention is the provision in a milling machine of a detachable housing unit for supporting a transmission train in interposed relation between a power driven member of the machine and an attachment carried thereby for the transmission of power from one to the other.

A further object of this invention is the provision of means to enclose an adjustable gear train carried by an adjustable quadrant whereby the parts will be fully protected in all positions of adjustment.

Other objects and advantages of the present invention should be readily apparent by reference to the following specification considered in conjunction with the accompanying claims but it will be understood that any changes may be made in the specific structural details hereinafter disclosed within the scope of the appended claims, without departing from or exceeding the spirit of the invention.

Referring to the drawing in which like reference numerals indicate like parts:

Figure 1 is an elevation of the transmission unit attached to the end of a milling machine table.

Figure 2 is an expanded view of the gear train.

Figure 3 is a side elevation partly in section of that shown in Figure 1.

Figure 4 is a detail of the locking screw for retaining the driving gear in the quadrant plate.

The reference numeral 10 indicates a support such as the knee of a knee and column type milling machine having mounted thereon the saddle 11 which carries the work table 12 for reciprocation thereon by a feed screw 13. These elements are well-known parts of one type of milling machine and form no part of the present invention.

It is customary in the operation of milling machines to provide attachments adapted to support work for relative movement with respect to the work table to perform other than plain machining operations thereupon such as cutting the teeth of spiral gears. It is desirable in such operations to have the work rotate in a predetermined relation with the horizontal movement of the table and for this purpose, mechanism is usually provided for causing rotation of the work by power which is supplied through the same means that reciprocates the table in order that a predetermined relation between the two movements may be established.

This invention comprises an improved means for effecting such a transmission of power and comprises a quadrant or sector plate 14 which is adapted to be detachably mounted in position on the machine to support a transmission train in power driving relation between the parts. Since it is necessary to provide for operation of the attachment at various rates relative to the feed screw the quadrant plate is movable so that various sizes of gears may be substituted, one for another, and to this end the quadrant plate is pivotally mounted on the end of the feed screw housing at 15 and has a bore 16 for receiving the projecting flange 17 of the gear 18. An annular groove 19 is formed in the flange for receiving the reduced end 20 of a set screw 21 fixed in the quadrant plate. The end of the set screw retains the gear in position in the bore and in mesh with the adjacent gears when the quadrant plate has been detached from the machine while at the same time permitting relative rotation of the gear with respect to the quadrant plate. This arrangement also permits rotation of the quadrant plate about the feed screw to effect proper meshing of the gears. The quadrant plate also has a finished surface 20' engaging the surface 21' of the attachment for supporting the parts in alignment and bolts 22 are provided which ride in slots 23 formed in the quadrant plate for clamping the plate in adjusted position.

In the present case the attachment 24 is provided with a bracket 25 for supporting a shaft 26 having a beveled gear 27 keyed at one end for actuating the attachment, while at the other end the shaft is provided with a reduced portion 28 for receiving thereon a gear of suitable size to suit the particular operation in hand.

The quadrant is adapted to support a train of gears for transmitting power from the feed screw 13 to the operating shaft 26 of the attachment. This train includes a large gear 29, actuated by the driving gear 18, and meshes with the small gear 30 of a gear couplet. A large gear 31 of the couplet is adapted to drive an adjustable gear 32 either directly or through a reverser 33. The reverser gear is mounted on a stub shaft 34 carried by a plate 35 pivotally mounted upon a bolt 36 by which it may be clamped in or out of mesh with the gear 31. The gear 32 is mounted for rotation upon the stud shaft 37 which has a T-head 38 mounted in the T-slot 39 of the quadrant plate whereby the gear 32 may be moved into mesh with either the reverser gear or directly with the driving gear 31. Associated with the gear 32 upon the same shaft is a second gear 40 which is adapted to mesh with the gear 41 mounted on the end of shaft 26. Since the gear 40 is carried by the quadrant plate and the gear 41 carried by the bracket attachment and since the gear 41 may vary in size, the meshing of this second gear is accomplished by pivoting the quadrant plate about the feed screw shaft 13 and clamping it into place by the bolts 22.

Attention is invited at this point to the fact that the gears 32 and 40 are not keyed to the stud shaft 37 because it is fixed and therefore, clutch teeth 42 are formed upon their lateral faces which are adapted to intermesh upon assembly of the gears upon the shaft to form a driving connection. These gears may also be reversed in position or gears of different size substituted in order to vary the rate of rotation of the driven shaft 28.

Since it is at times desirable to effect manual movement of the parts for set-up or adjustment purposes, provision has been made for the manual operation of table and attachment by providing a manually operated gear 43 which is mounted upon a stud shaft 44 fixed to the quadrant plate for supporting the gear in mesh with the gear 18. The gear 43 is provided with an extending sleeve portion having clutch teeth 45 formed in the end thereof and a manually operated lever 46 is provided on the end of the shaft having clutch teeth 47 for interengagement with the clutch teeth 45 to effect manual operation of the parts. A spring 48 is interposed between the lever and gear to hold the parts separated except when actually being used, to insure against rotation of the handle or lever when the machine is power operated.

It is usually desirable with a transmission gear train to enclose the gears to prevent accidents and for other well known reasons and therefore, a guard or housing has been provided comprising a cover plate 49 which is adapted to enclose the gear train in all its positions of adjustment. A stud bolt 50 is fixed to the quadrant and has a reduced end for receiving the plate and a nut 51 for securing the plate thereto. The stud shaft 37, previously referred to, is also reduced at the end and the cover plate is provided with a slot 52 for receiving the reduced end of the shaft and to which it is clamped by the nut 53. It will be apparent that the slot 52 permits adjustment of the shaft 37 while at the same time permitting the shaft 37 to be used as a support for the cover plate in its various positions of adjustment. A handle 54 is fixed to the quadrant plate for effecting movement thereof about the shaft 13 to effect meshing of the gears 40 and 41.

In order to mount the attachment on the machine it is apparent by reference to Figure 2, that the gear 41 must be removed from the shaft 28 so that the quadrant plate may be mounted in position, as the hole 56 in the quadrant plate is only large enough to permit passage of the sleeve 55 of the bracket 25. After the quadrant plate has been mounted in position and the bolts 22 hand tightened, the desired gears are placed upon the shafts 28 and 37 whereupon the quadrant plate is moved by the handle 54 until the gear 40 meshes with the gear 41. The bolts 22 may now be further tightened to hold the parts in adjusted position. During these operations the cover plate is removed and may now be placed in position and secured therein by the nuts 51 and 53.

That which is claimed is:

1. A milling machine having a reciprocating table and an attachment carried thereby, a feed screw adapted to effect said reciprocation, a detachable transmission unit, means to secure the unit in power transmitting relation between the feed screw and attachment whereby, upon actuation of the feed screw, the attachment will be operated in timed relation with respect to the table, and means to oscillate the unit to sever the power transmitting relationship.

2. A milling machine having a reciprocating table, an attachment carried thereby, a feed screw adapted to effect said reciprocation, a detachable transmission unit, means to secure the unit in power transmitting relation between the feed screw and attachment whereby upon operation of the feed screw the attachment will be operated in timed relation thereto, a housing adapted to be detachably mounted on said unit for enclosing the transmission, and means to oscillate the unit and housing about the axis of the feed screw to sever the power transmitting relationship.

3. A milling machine having a table, a feed screw for effecting reciprocation thereof, an attachment mounted on the table having an operating shaft, a detachable transmission unit adapted to be interposed between the feed screw and the said shaft for power actuation thereof, manual means carried by the unit for operating said transmission to effect reciprocation of the table and actuation of the attachment in predetermined timed relation to one another, and means to oscillate the unit about the axis of the feed screw to disconnect the attachment from the feed screw.

4. A milling machine having a reciprocating table, a feed screw for effecting said reciprocation, an attachment carried by the table and having a drive shaft extending parallel to said feed screw, a detachable quadrant plate carrying a transmission train mounted on the end of the table with the transmission in driving engagement with said screw, the transmission terminating in a final drive member, said plate having a slot for receiving the end of the drive shaft, a change gear adapted to be secured to said shaft, and means to pivot the quadrant plate about the feed screw to effect engagement of the final drive member with said change gear.

5. A milling machine having a table, a feed screw for effecting reciprocation thereof, an auxiliary work support carried by the table including an actuating shaft adapted to receive a plurality of change gears, a quadrant plate, a gear train supported by said plate including a reverser, means to pivotally support the quadrant plate about the feed screw, and means to adjust the quadrant plate to effect intermeshing of the final drive member of the gear train with the change gear on said first named shaft.

6. A milling machine having a table, a feed screw for effecting reciprocation thereof, an attachment carried by the table and having an actuating shaft extending parallel to said feed screw, a quadrant plate, a gear train carried thereby, means to mount the quadrant plate on the end of the table to support the gear train in power transmitting relation between the feed screw and shaft, said gear train including a reverser gear, a plate pivotally mounted on said quadrant and having means for rotatably supporting the reverser gear, and means to lock the plate and thereby position the gear in either a power transmitting or a non-power transmitting position.

7. A milling machine having a table, a feed screw therefor, an attachment carried by the table having an operating shaft for supporting a change gear, a quadrant plate for supporting a transmission train between the feed screw and shaft, said train terminating in a laterally adjustable gear, a stud shaft supporting said gear, means to lock the shaft to the quadrant plate and maintain the gear in driving relation to the change gear, a housing for enclosing said gear train, means to attach the housing to the quadrant plate including a bolt fixed to the quadrant and engaging one end of the housing, a slot in the housing at substantially the other end for receiving said stud shaft, and means to secure the housing to the stud shaft in any of its adjustable positions, said slot extending substantially longitudinally of the housing whereby the housing will enclose the gear train irrespective of the position of said stud shaft.

8. A milling machine having a table, a housing attached to the end of the table and having a projecting flange, a feed screw journaled in said housing and having a splined end projecting beyond said flange, a quadrant plate having a transmission train attached thereto for operating an attachment carried by the table, said train including a drive gear having a peripheral flange and a central bore, an opening in said quadrant plate for receiving and rotatably supporting the flange of said gear, said flange having a peripheral groove, means mounted in the plate engaging said groove to maintain the gear in fixed position, and means to secure the plate on the projecting flange of the table whereby the splined end of the feed screw will be received in the central bore of the drive gear.

9. A milling machine having a table, a feed screw for effecting reciprocation thereof, an attachment mounted on the table having an operating shaft, a detachable transmission unit extending from the feed screw to the operating shaft including a quadrant plate, a drive gear connectible with the end of the feed screw, speed change gearing carried by the plate for coupling the drive gear to the attachment for power actuation thereof, an additional gear meshing with said drive gear, manual means for actuating said gear and thereby the table and attachment, and means to rotate the quadrant plate to disconnect all actuating means from the attachment.

LESTER F. NENNINGER.